(12) United States Patent
Brawn et al.

(10) Patent No.: US 7,373,550 B2
(45) Date of Patent: May 13, 2008

(54) GENERATION OF A COMPUTER PROGRAM TO TEST FOR CORRECT OPERATION OF A DATA PROCESSING APPARATUS

(75) Inventors: Jonathan William Brawn, Austin, TX (US); Simon John Craske, Cambridge (GB); Peter Logan Harrod, Cambridge (GB); Eric Jason Furbish, Austin, TX (US)

(73) Assignee: ARM Limited, Cambridge (GB)

( * ) Notice: Subject to any disclaimer, the term of this patent is extended or adjusted under 35 U.S.C. 154(b) by 534 days.

(21) Appl. No.: 11/049,296

(22) Filed: Feb. 3, 2005

(65) Prior Publication Data

US 2006/0174097 A1 Aug. 3, 2006

(51) Int. Cl.
*G06F 11/00* (2006.01)
(52) U.S. Cl. .......................................... 714/28; 703/22
(58) Field of Classification Search ..................... None
See application file for complete search history.

(56) References Cited

U.S. PATENT DOCUMENTS

| | | | |
|---|---|---|---|
| 5,488,573 A | | 1/1996 | Brown et al. |
| 5,671,352 A | * | 9/1997 | Subrahmaniam et al. ...... 714/41 |
| 5,913,064 A | | 6/1999 | Chen |
| 6,178,533 B1 | * | 1/2001 | Chang ........................ 714/739 |
| 6,625,760 B1 | * | 9/2003 | Man et al. ..................... 714/33 |
| 6,728,668 B1 | * | 4/2004 | Kitamorn et al. ............. 703/22 |
| 6,885,983 B1 | * | 4/2005 | Ho et al. ....................... 703/14 |
| 6,918,098 B2 | * | 7/2005 | Smith et al. .................... 716/4 |
| 6,941,499 B1 | * | 9/2005 | Sung et al. ................. 714/741 |
| 7,032,133 B1 | * | 4/2006 | Lang et al. .................... 714/33 |
| 7,065,676 B1 | * | 6/2006 | Lang et al. .................... 714/33 |
| 7,117,131 B2 | * | 10/2006 | Binnig ............................ 703/2 |
| 7,139,936 B2 | * | 11/2006 | Petsinger et al. .............. 714/28 |
| 7,236,911 B1 | * | 6/2007 | Gough et al. ................ 702/185 |
| 7,239,978 B2 | * | 7/2007 | Cheng et al. ................ 702/185 |
| 2001/0027539 A1 | * | 10/2001 | Nozuyama .................... 714/33 |
| 2003/0154432 A1 | * | 8/2003 | Scott et al. .................. 714/724 |
| 2003/0208351 A1 | * | 11/2003 | Hartman et al. .............. 703/22 |
| 2004/0015791 A1 | | 1/2004 | Smith et al. |
| 2004/0088615 A1 | * | 5/2004 | Kundu ........................ 714/724 |
| 2004/0133409 A1 | * | 7/2004 | Mukherjee et al. ........... 703/14 |
| 2005/0159936 A1 | * | 7/2005 | Rees et al. ..................... 703/6 |
| 2005/0182587 A1 | * | 8/2005 | Sato et al. .................. 702/117 |
| 2006/0123278 A1 | * | 6/2006 | Dini et al. ................... 714/712 |
| 2006/0156261 A1 | * | 7/2006 | Farkash et al. ................ 716/5 |
| 2007/0016389 A1 | * | 1/2007 | Ozgen .......................... 703/10 |
| 2007/0050740 A1 | * | 3/2007 | Jacobi et al. ................... 716/5 |

OTHER PUBLICATIONS

M. Bose et al, "A Genetic Approach to Automatic Bias Generation for Biased Random Instruction Generation" Evolutionary Computation 2001, May 2001, pp. 442-448.
M. Bose et al, "Automatic Bias Generation Using Pipeline Instruction State Coverage for Biased Random Instruction Generation" On-Line Testing Workshop 2001, Jul. 2001, pp. 65-71.

* cited by examiner

*Primary Examiner*—Christopher McCarthy
(74) *Attorney, Agent, or Firm*—Nixon & Vanderhye P.C.

(57) ABSTRACT

Software built in self test computer programs 12 are generated using a genetic algorithm 14 technique. A fault simulator 20 is used to simulate candidate software built in self test computer programs and compare the simulated execution, such to deliberately introduced test faults, with expected execution outcomes previously derived for that candidate program to determine the sensitivity of that candidate program to the faults which are introduced. This score can be fed back into the genetic algorithm mutation to converge the mutation process upon appropriately fault sensitive software built in self test program code.

15 Claims, 4 Drawing Sheets

GENERATION OF A COMPUTER PROGRAM TO TEST FOR CORRECT OPERATION OF A DATA PROCESSING APPARATUS

BACKGROUND OF THE INVENTION

1. Field of the Invention

This invention relates to the field of data processing systems. More particularly, this invention relates to the generation of computer programs for testing data processing apparatus for correct operation.

2. Description of the Prior Art

The testing of data processing apparatus for correct operation is an important area. Data processing systems are increasingly being used in critical environments where it is desirable to be able to regularly check that those data processing systems are operating correctly and continue to be fault free. With the this in mind, it is known to provide data processing systems with built in self test (BIST) capabilities such that, for example, when the data processing system is initialised it performs hardware tests upon itself to check for correct operation. It may additionally be advisable to periodically perform tests upon the data processing apparatus to ensure that it continues to operate without error. In order to achieve this, it is known to write software for performing built in self testing (SBIST). This software can be periodically run and the outcome of running that software checked to ensure that it was executed correctly, this being indicative of the data processing system operating correctly.

In order that such SBIST code should perform a comprehensive test of the data processing apparatus upon which it is being executed, it is desirable that it should cause the data processing apparatus to adopt a wide variety of functional states covering a corresponding wide variety of possible ways in which that data processing apparatus may operate. In addition, it is desirable that the software to be run should be of a type, that if a fault does occur within the data processing system, then this will be revealed by a change in the processing outcome resulting from executing the self-test software. As the complexity of data processing systems increases, the difficulty of writing software to meet the above criteria also increases and is a task which can take a highly skilled software engineer a disadvantageously long time to complete. Such a software engineer can use their skill and knowledge of the data processing system concerned to exercise a wide variety of its functional capabilities with such hand written code, but even when this considerable effort is undertaken it can be difficult to verify objectively how thorough such test code is in exercising the data processing system and being sensitive to possible faults.

SUMMARY OF THE INVENTION

Viewed from one aspect the present invention provides a method of generating a computer program for execution by a data processing apparatus to test for correct operation of said data processing apparatus, said method comprising:

(i) forming a candidate computer program with an associated expected execution outcome;

(ii) simulating execution of said candidate computer program by said data processing apparatus with a fault simulator using a circuit model of said data processing apparatus including one or more faults introduced into said circuit model by said fault simulator;

(iii) generating an execution outcome from said simulated execution with said fault simulator;

(iv) scoring said candidate computer program in dependence upon whether said one or more faults introduced by said fault simulator produce a detectable change in said execution outcome compared to said expected execution outcome produced by simulated execution of said candidate without said one or more faults;

(v) mutating said candidate computer program to form a mutated candidate computer program with an associated execution outcome;

(vi) repeating steps (ii), (iii) and (iv) in respect of said mutated candidate computer program;

(vii) replacing said candidate computer program with said mutated candidate computer program if a score for said mutated candidate computer program indicates it has a higher probability of producing a detectable change in execution outcome in response to said one or more faults than said candidate computer program; and (viii) testing if one or more mutation termination conditions have been met and if said one or more mutation termination conditions have not been met then repeating steps (v), (vi), (vii) and (viii).

The present technique recognises that genetic algorithms can be employed to automatically generate computer programs for testing a data processing apparatus for correct operation with the ability of those computer programs to be sensitive to faults simulated upon the data processing apparatus being made a convergence criteria in a way that allows the technique to produce effective test computer programs in a reasonable amount of time. Furthermore, the test computer programs generated in this way can have an objective assessment of their sensitivity to fault conditions. This is particularly useful in safety critical systems, such as automotive braking systems, where objective information concerning fault management is highly beneficial.

The process of generating the candidate computer programs with their associated expected execution outcome can be speeded up by using an instruction set simulator to simulate their execution and generate the expected execution outcome data.

The instruction set simulator can also be used with the addition of appropriate annotation to score the candidate computer programs for the breadth of their functional state coverage. Such a scored breadth of coverage can then be used as a metric to select in favour of appropriately mutated (i.e. coverage increasing) candidate computer programs.

The formation of the candidate computer programs and the associated execution outcome can also be conducted using an RTL (register transfer language) simulator. Whilst such a simulator will typically be slower than an instruction set simulator, and accordingly desirable to use after the instruction set simulator has produced suitable good candidates, an RTL simulator has the advantage of being able to produce an additional type of scoring based upon a breadth of RTL line coverage or RTL register value toggling measured during simulation of the candidate computer programs with the RTL simulator.

It will be appreciated that the test computer programs to be generated should advantageously be capable of being executed by the data processing system without interfering with other programs being executed in parallel. With this in mind, the mutated candidate computer programs are subject to predetermined constraints, such as, for example, memory usage requirements, not masking interrupts and the like as such factors are significant in not interfering with the operation of other programs.

The generation technique may be automated in a way that reduces the overhead associated with the production of such test computer programs and the system can be allowed to iterate until appropriate termination conditions are reached, such as a probability of producing a detectable change in execution outcome exceeding a predetermined level, such a probability ceasing to improve at a rate above a certain rate (indicative of convergence upon a solution), the number of iterations being performed exceeding a predetermined number or the time spent iterating the solutions exceeding a predetermined time.

The expected execution outcome can be measured and determined in a wide variety of ways. A highly useful and sensitive technique is to arrange for the computer program itself to store one or more sets of data characterising a current state of the data processing apparatus when that computer program is being simulated such that when that computer program is later being run to test a physical data processing apparatus, then those stored sets of data can be compared against the actual results produced by the physical device and a comparison made to check for proper operation of the physical device.

A good example of the type of state data which can be recorded for such a checkpointing procedure is the contents of the data processing registers of the system at particular points in time.

The faults which are introduced by the fault simulator into the data processing system can take a variety of different forms and should desirably cover a wide spectrum of the possible faults which could occur during real operation. One particular type of fault which can be problematic to develop test computer programs to check for is faults associated with voltage scaling or frequency scaling changes which may be applied to the data processing apparatus. Such changes can produce failures in parts of the data processing apparatus which are difficult to predict even with a skilled engineer and accordingly such automated and objective test computer program generating techniques as described above are highly useful in developing tests sensitive to this type of fault cause.

Viewed from another aspect the present invention provides apparatus for processing data operable to generate a computer program for execution by a data processing apparatus to test for correct operation of said data processing apparatus, said apparatus comprising logic operable to perform the steps of:

(i) forming a candidate computer program with an associated expected execution outcome;

(ii) simulating execution of said candidate computer program by said data processing apparatus with a fault simulator using a circuit model of said data processing apparatus including one or more faults introduced into said circuit model by said fault simulator;

(iii) generating an execution outcome from said simulated execution with said fault simulator;

(iv) scoring said candidate computer program in dependence upon whether said one or more faults introduced by said fault simulator produce a detectable change in said execution outcome compared to said expected execution outcome produced by simulated execution of said candidate without said one or more faults;

(v) mutating said candidate computer program to form a mutated candidate computer program with an associated execution outcome;

(vi) repeating steps (ii), (iii) and (iv) in respect of said mutated candidate computer program;

(vii) replacing said candidate computer program with said mutated candidate computer program if a score for said mutated candidate computer program indicates it has a higher probability of producing a detectable change in execution outcome in response to said one or more faults than said candidate computer program; and (viii) testing if one or more mutation termination conditions have been met and if said one or more mutation termination conditions have not been met then repeating steps (v), (vi), (vii) and (viii).

Viewed from a further aspect the present invention provides a computer program product bearing a computer program for controlling a computer to perform a method of generating a computer program for execution by a data processing apparatus to test for correct operation of said data processing apparatus, said method comprising:

(i) forming a candidate computer program with an associated expected execution outcome;

(ii) simulating execution of said candidate computer program by said data processing apparatus with a fault simulator using a circuit model of said data processing apparatus including one or more faults introduced into said circuit model by said fault simulator;

(iii) generating an execution outcome from said simulated execution with said fault simulator;

(iv) scoring said candidate computer program in dependence upon whether said one or more faults introduced by said fault simulator produce a detectable change in said execution outcome compared to said expected execution outcome produced by simulated execution of said candidate without said one or more faults;

(v) mutating said candidate computer program to form a mutated candidate computer program with an associated execution outcome;

(vi) repeating steps (ii), (iii) and (iv) in respect of said mutated candidate computer program;

(vii) replacing said candidate computer program with said mutated candidate computer program if a score for said mutated candidate computer program indicates it has a higher probability of producing a detectable change in execution outcome in response to said one or more faults than said candidate computer program; and (viii) testing if one or more mutation termination conditions have been met and if said one or more mutation termination conditions have not been met then repeating steps (v), (vi), (vii) and (viii).

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
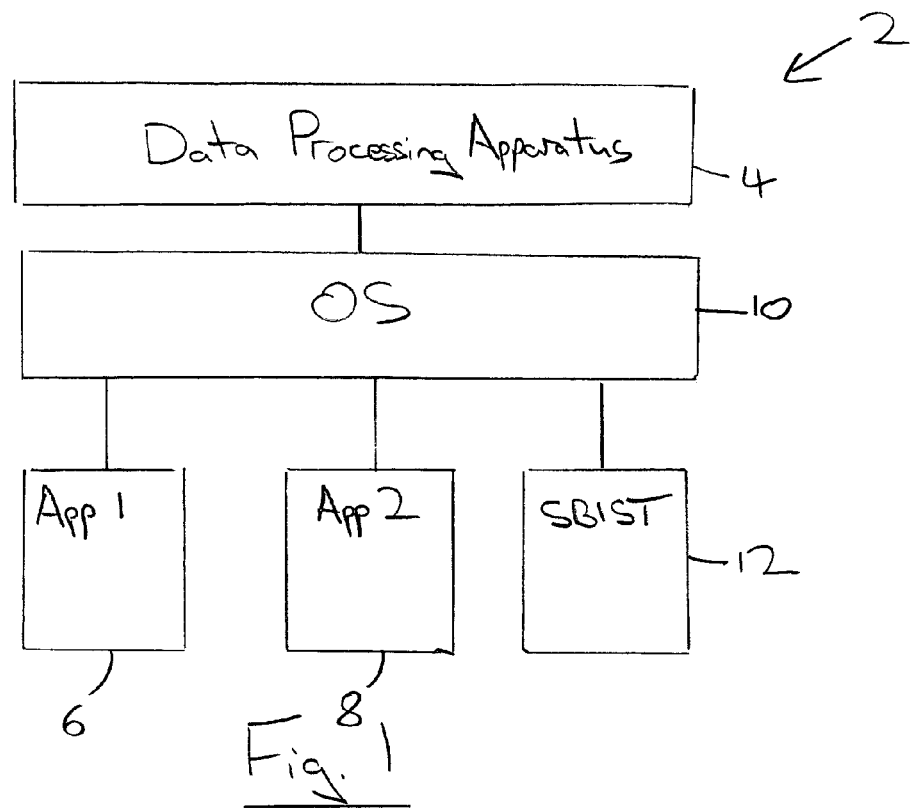
FIG. 1 schematically illustrates a data processing system executing a plurality of application programs including a software built in self test program.

FIG. 1 schematically illustrates a data processing system 2 including a data processing apparatus 4, such as a system-on-chip integrated circuit of the type that could be used in controlling an automotive braking system. This data processing apparatus 4 executes a plurality of application programs 6, 8, using an operating system 10. A software built in self test program 12 is also periodically executed using the operating system 10 to check for the correct operation of the data processing apparatus 4. The software built in self test program 12 will execute with a view to causing the data processing apparatus 4 to adopt a wide range of functional states that are sensitive to potential faults which might occur and then check that the execution outcome is as expected upon completion and during the execution of the software built in self test program 12. If a fault is detected, then appropriate action may be taken, for example generating a warning to a user of the system that it is potentially subject to faulty operation and caution is needed.

Figure 2:
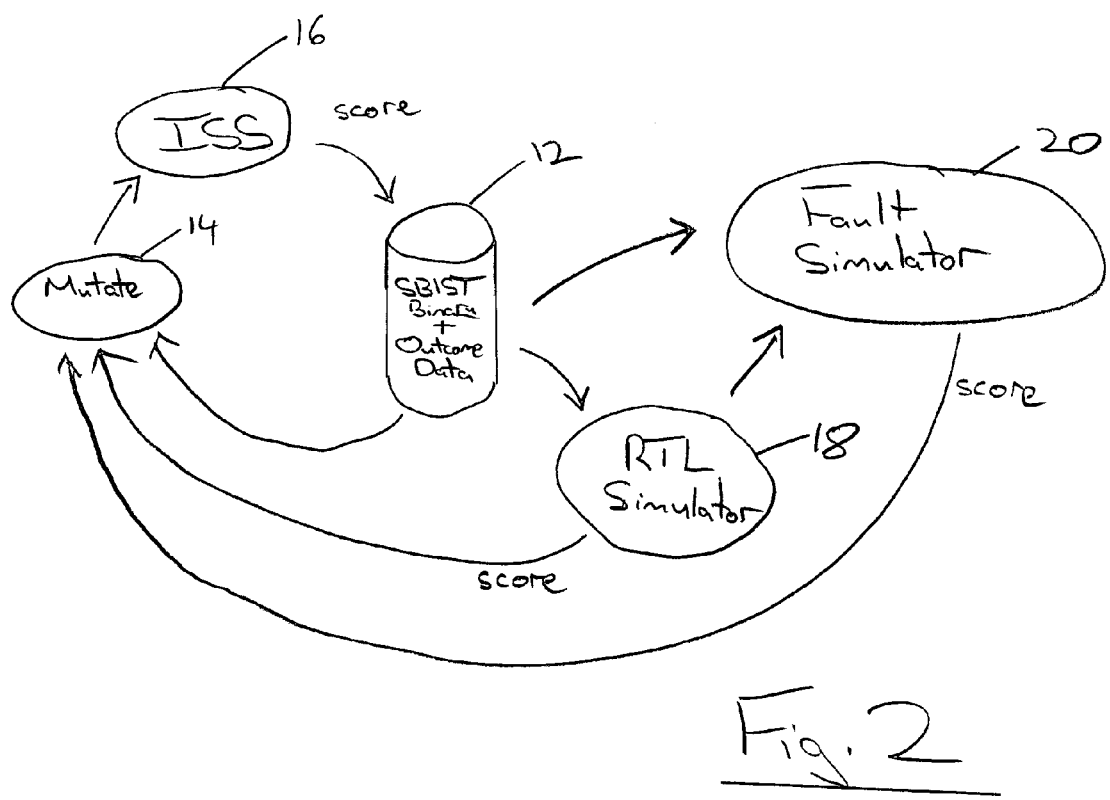
FIG. 2 schematically illustrates a methodology for generating a software built in self test program using an instruction set simulator, an RTL simulator and a fault simulator in combination as part of a genetic algorithm technique.

FIG. 2 schematically illustrates a technique for generating a software built in self test program 12. An initial seed software built in self test program 12 can be hand written to provide a starting point for the genetic algorithm mutation processes and simulations which will produce the final test computer program. This seed test computer program can include code which will conduct appropriate checkpoint data generation and checkpoint data checking as will be described later. This checkpointing code is left intact and not subject to mutation since its role is not required to alter and the mutated code portions can be responsible for giving the breadth of coverage of the operation of the data processing apparatus 4, with this coverage being objectively measurable. The software built in self test program 12 has associated with it execution outcome data. This can be the checkpoint and data previously discussed.

The software built in self test program 12 is subject to mutation by a genetic algorithm 14 before being simulated with an instruction set simulator 16. The instruction set simulator 16 is annotated with finctional state annotations such that a score can be derived for a particular software built in self test program 12 as to its breadth of functional state coverage when it is executed. This scoring provides feedback into the genetic algorithm mutation 14 so that the mutating portions of the software built in self test program 12 can be automatically altered to give a broad functional state coverage. The instruction set simulator 16 will also track the execution outcome which is expected to be produced by correct execution of the software built in self test program 12 with this outcome data being associated with the software built in self test program 12. The instruction set simulator 16 allows relatively rapid simulation and a large number of iterations to be performed.

When appropriate termination conditions have been reached regarding the breadth of function state coverage as can be tested by the instruction set simulator 16, the candidate computer program 12 arrived at at that time can then be simulated using an RTL simulator 18. The RTL simulator 18 produces a slower but in some ways more accurate and detailed simulation of the execution of that software built in test program 12 allowing it to be scored for its RTL line coverage and RTL register value toggling outcome. Reference to a broad range of the RTL lines which define the data processing apparatus 4 as well as the property of toggling a wide range of the register values represented by that RTL description provides a useful metric for measuring the thoroughness and desirability of a candidate software built in self test program 12. This score can accordingly be fed into the genetic algorithm mutation 14 to steer the mutation as the process iterates.

When the RTL simulator 18 has converged on a candidate software built in self test program 12 then this is simulated upon a fault simulator 20 which simulates the execution of that program upon a data processing apparatus defined by the RTL model which was used by the RTL simulator 18 but subject to one or more deliberately introduced faults. The fault simulator 20 seeks to expose errors which can occur in the processing outcome as a result of faults introduced. It is possible to stress a particular design by simulating a device manufactured outside or at the edge of the manufacturing tolerances, operating that device at the extremes of its expected operational frequency or operational voltage and other similar potential fault inducing situation. The fault simulator 20 can compare the expected outcome data which was associated with the software built in self test program 12 with the actual processing outcome data it determines would be generated with the faults being tested. The ability to identify such faults due to a difference in the processing outcome is in turn used to produce a score which is fed into the genetic algorithm mutation 14 to select in favour of candidate software built in self test programs 12 which are sensitive to the faults which are introduced and may encountered in the real physical data processing apparatus 4.

It will be appreciated that the technique illustrated in FIG. 2 can be considered to be a nested form of simulation and mutation with the instruction set simulator 16 executing fastest and upon the inner loop with the candidates it produces then being simulated with the RTL simulator 18 and finally on the outer, slowest loop the RTL simulation produces candidates then being tested with the fault simulator 20.

Figure 3:
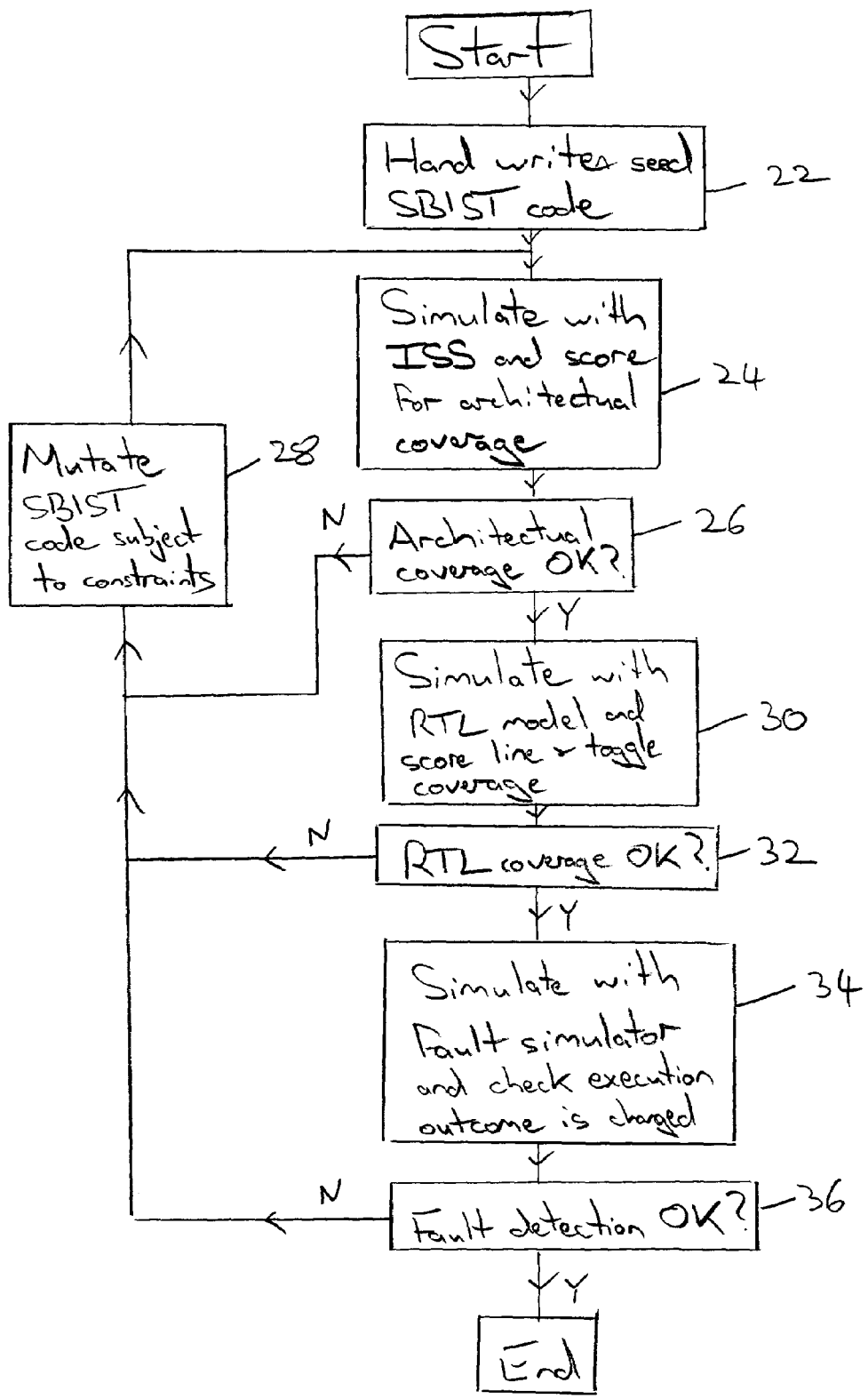
FIG. 3 is a flow diagram schematically illustrating the technique of FIG. 2.

FIG. 3 is a flow diagram schematically illustrating the process of FIG. 2. At step 22 a hand written seed software built in self test program is produced. Step 24 then simulates execution of this candidate and scores it for architectural (functional state) coverage. Step 26 then determines whether this architectural coverage meets a predetermined limit and if it does not then the candidate computer program is subject to mutation at step 28 before the processing is returned to step 24 for another simulation and scoring attempt. The mutation performed at step 28 is subject to constraint to ensure that the computer program generated is not such that it will interfere with other computer programs which may be running parallel, such as by ensuring a certain form of memory usage (e.g. not straying outside a predetermined memory footprint) or that the computer program does not inappropriately change the configuration of the data processing apparatus, such as by masking interrupts, in a way which would impact prejudicially other applications running in parallel.

If the test at step 26 was that the architectural coverage of the candidate test computer program is sufficient, then this candidate is passed to step 30 where it is simulated with an RTL simulator using an RTL model of the data processing apparatus 4. The line and toggle coverage of the test computer program concerned can be scored during the simulation at step 30. A high line coverage and a high coverage of toggled register values is indicative of a thorough test. Step 32 then determines whether or not that RTL simulation coverage meets predetermined criteria. If these predetermined criteria are not met, then the candidate test computer program can be mutated at step 28 and the processing returned to step 24. The mutation made at step 28 may well result in the architectural coverage still meeting the requirement at step 26 and so the system will rapidly return to the RTL simulation at step 30 without requiring a large number of instruction set simulations/iteration to be run at steps 24, 26, 28.

When the RTL coverage requirements of step 32 have been met, then the candidate test computer program is passed to step 34 where its execution is simulated with a fault simulator. The processing/execution outcome of the simulation performed by the fault simulator is compared against the expected execution outcome associated with that candidate test computer program (as was generated in the instruction set simulation). A difference between the detected and the expected processing outcome produced at step 34 is an indication that the candidate test computer program is appropriately sensitive to the type of faults which are deliberately introduced into the data processing apparatus by the fault simulator. Step 36 determines whether this fault sensitivity meets predetermined thresholds. If the fault sensitivity is not sufficient then processing may again pass to the mutation of step 28.

Figure 4:
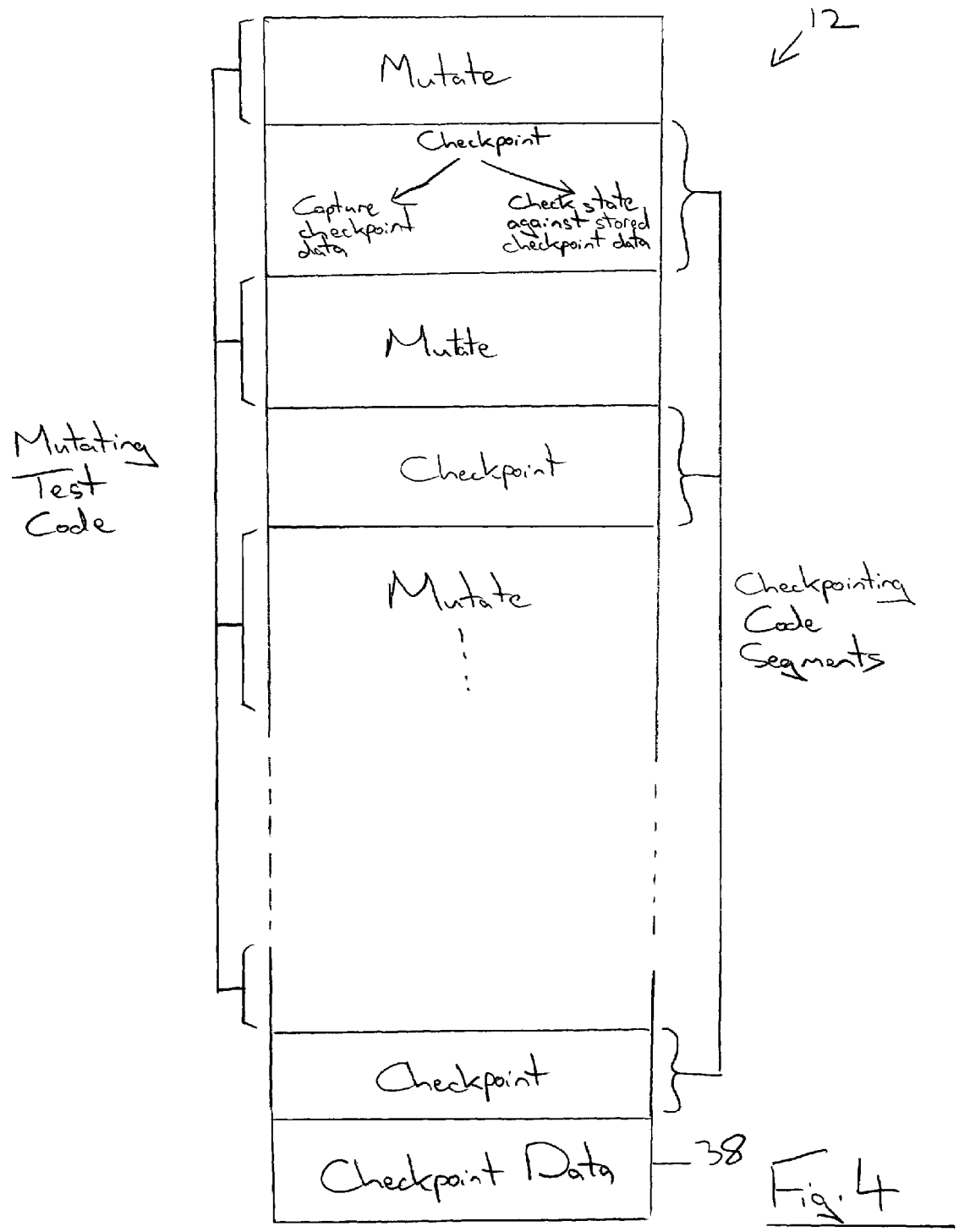
FIG. 4 is a diagram schematically illustrating an example test computer program which may be produced including check pointing code and checkpoint data distributed within that test computer program.

FIG. 4 schematically illustrates a software built in self test program 12 formed of a plurality of code portions some of which are subject to mutation by the genetic algorithm techniques described previously and some of which are not mutated as their role is to capture and subsequently check checkpoint data indicative of the state of the data processing apparatus having executed the preceding mutatable test computer program portions. The checkpoint code performs the function, for example, of capturing the state data, such as the value stored within the data processing registers of a register bank of a data processing apparatus 4 and assembling this into sets of checkpoint data 38 associated with the software built in self test program 4. The checkpointing code when executed by the fault simulator serves to check the simulated state at a particular time against the expected state stored within the checkpoint data 38. The checkpoint data 38 gives the expected processing outcome information.

Figure 5:
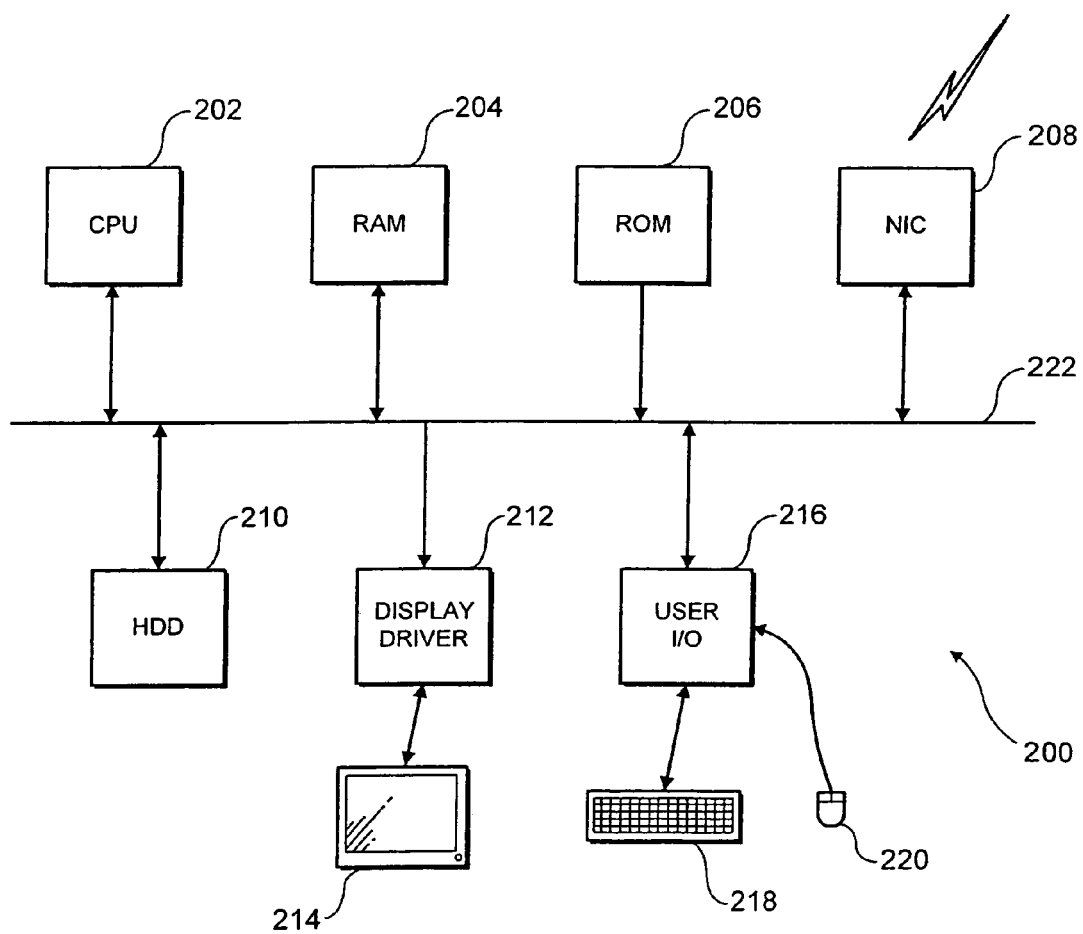
FIG. 5 is a diagram schematically illustrating a general purpose computer of the type which can be used to implement the above described techniques.

FIG. 5 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 5 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of generating a computer program for execution by a data processing apparatus to test for correct operation of said data processing apparatus, said method comprising:
(i) forming a candidate computer program with an associated expected execution outcome;
(ii) simulating execution of said candidate computer program by said data processing apparatus with a fault simulator using a circuit model of said data processing apparatus including one or more faults introduced into said circuit model by said fault simulator;
(iii) generating an execution outcome from said simulated execution with said fault simulator;
(iv) scoring said candidate computer program in dependence upon whether said one or more faults introduced by said fault simulator produce a detectable change in said execution outcome compared to said expected execution outcome produced by simulated execution of said candidate without said one or more faults;
(v) mutating said candidate computer program to form a mutated candidate computer program with an associated execution outcome;
(vi) repeating steps (ii), (iii) and (iv) in respect of said mutated candidate computer program;
(vii) replacing said candidate computer program with said mutated candidate computer program if a score for said mutated candidate computer program indicates it has a higher probability of producing a detectable change in execution outcome in response to said one or more faults than said candidate computer program; and
(viii) testing if one or more mutation termination conditions have been met and if said one or more mutation termination conditions have not been met then repeating steps (v), (vi), (vii) and (viii).

2. A method as claimed in claim 1, wherein forming said candidate computer program with an associated expected execution outcome and forming said mutated candidate computer program with an associated expected execution outcome uses an instruction set simulator.

3. A method as claimed in claim 2, wherein during simulated execution with said instruction set simulator a mutated candidate computer program is scored for breadth of functional state coverage by monitoring which different functional states of said data processing apparatus are adopted during said simulated execution, mutated candidate computer programs having a greater breadth of functional state coverage being preferentially selected.

4. A method as claimed in claim 1, wherein forming said candidate computer program with an associated execution outcome and forming said mutated candidate computer program with an associated execution outcome uses an RTL simulator.

5. A method as claimed in claim 4, wherein during simulated execution with said RTL simulator a mutated candidate computer program is scored for breadth of RTL line coverage by monitoring which different RTL lines defining said data processing apparatus are used during said simulated execution, mutated candidate computer programs having a greater breadth of RTL line coverage being preferentially selected.

6. A method as claimed in claim 4, wherein during simulated execution with said RTL simulator a mutated candidate computer program is scored for breadth of RTL toggle coverage by monitoring which different RTL register value defining said data processing apparatus are changed during said simulated execution, mutated candidate computer programs having a greater breadth of RTL toggle coverage being preferentially selected.

7. A method as claimed in claim 1, wherein forming said mutated candidate computer program with an associated execution outcome is subject to one or more predetermined constraints to ensure that mutated candidate computer program can be executed by said data processing apparatus without preventing execution of one or more other computer programs by said data processing apparatus.

8. A method as claimed in claim 7, wherein said one or more predetermined constraints include:
   (i) memory usage requirements that do not conflict with memory usage requirements of said one or more other computer programs; and
   (ii) no masking of interrupts.

9. A method as claimed in claim 1, wherein said one or more mutation termination condition include:
   (i) a probability of producing a detectable change in execution outcome in response to said one or more faults exceeding a predetermined level;
   (ii) a probability of producing a detectable change in execution outcome in response to said one or more faults ceasing to improve at a rate per iteration above a predetermined rate;
   (iii) a number of iterations of said candidate computer program exceeding a predetermined number; and
   (iv) a time spent iterating said candidate computer program exceeding a predetermined time.

10. A method as claimed in claim 1, wherein said associated expected execution outcome includes one or more sets of data characterising a current state of said data processing apparatus written to a memory region by said candidate computer program during simulated execution of said candidate computer program when forming said candidate computer program.

11. A method as claimed in claim 10, wherein when simulating execution of said candidate computer program with said fault simulator, said candidate computer program reads said one or more sets of data from said memory region and compares these with a current state of said data processing apparatus to detect any change in execution outcome.

12. A method as claimed in claim 10, wherein said data processing apparatus has a plurality of data processing registers and said one or more sets of data include a copy of data values read from said plurality of data processing registers.

13. A method as claimed in claim 1, wherein said one or more faults are selected to be faults arising from at least one of operating voltage scaling or operating frequency scaling applied to said data processing apparatus.

14. Apparatus for processing data operable to generate a computer program for execution by a data processing apparatus to test for correct operation of said data processing apparatus, said apparatus comprising logic operable to perform the steps of:
   (i) forming a candidate computer program with an associated expected execution outcome;
   (ii) simulating execution of said candidate computer program by said data processing apparatus with a fault simulator using a circuit model of said data processing apparatus including one or more faults introduced into said circuit model by said fault simulator;
   (iii) generating an execution outcome from said simulated execution with said fault simulator;
   (iv) scoring said candidate computer program in dependence upon whether said one or more faults introduced by said fault simulator produce a detectable change in said execution outcome compared to said expected execution outcome produced by simulated execution of said candidate without said one or more faults;
   (v) mutating said candidate computer program to form a mutated candidate computer program with an associated execution outcome;
   (vi) repeating steps (ii), (iii) and (iv) in respect of said mutated candidate computer program;
   (vii) replacing said candidate computer program with said mutated candidate computer program if a score for said mutated candidate computer program indicates it has a higher probability of producing a detectable change in execution outcome in response to said one or more faults than said candidate computer program; and
   (viii) testing if one or more mutation termination conditions have been met and if said one or more mutation termination conditions have not been met then repeating steps (v), (vi), (vii) and (viii).

15. A computer program product comprising a computer readable storage medium containing computer readable instructions for controlling a computer to perform a method of generating a computer program for execution by a data processing apparatus to test for correct operation of said data processing apparatus, said method comprising:
   (i) forming a candidate computer program with an associated expected execution outcome;
   (ii) simulating execution of said candidate computer program by said data processing apparatus with a fault simulator using a circuit model of said data processing apparatus including one or more faults introduced into said circuit model by said fault simulator;
   (iii) generating an execution outcome from said simulated execution with said fault simulator;
   (iv) scoring said candidate computer program in dependence upon whether said one or more faults introduced by said fault simulator produce a detectable change in said execution outcome compared to said expected execution outcome produced by simulated execution of said candidate without said one or more faults;
   (v) mutating said candidate computer program to form a mutated candidate computer program with an associated execution outcome;
   (vi) repeating steps (ii), (iii) and (iv) in respect of said mutated candidate computer program;
   (vii) replacing said candidate computer program with said mutated candidate computer program if a score for said mutated candidate computer program indicates it has a higher probability of producing a detectable change in execution outcome in response to said one or more faults than said candidate computer program; and
   (viii) testing if one or more mutation termination conditions have been met and if said one or more mutation termination conditions have not been met then repeating steps (v), (vi), (vii) and (viii).

* * * * *